No. 890,115. PATENTED JUNE 9, 1908.
A. E. WYATT.
VENDING MACHINE.
APPLICATION FILED MAR. 13, 1906.
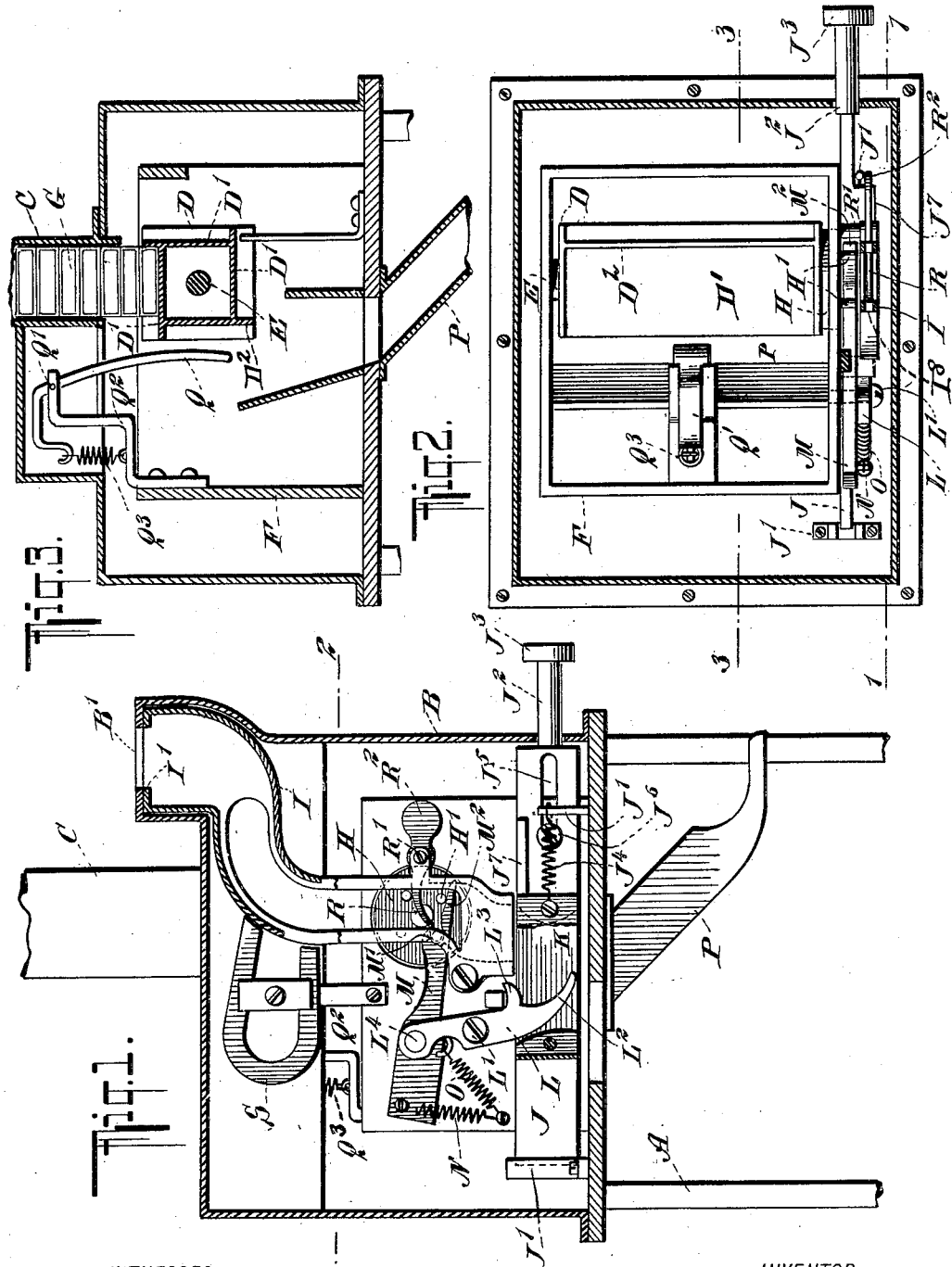
WITNESSES:
INVENTOR
Albert E. Wyatt
BY
Briesen & Knauth
ATTORNEYS

UNITED STATES PATENT OFFICE.

ALBERT E. WYATT, OF HOBOKEN, NEW JERSEY.

VENDING-MACHINE.

No. 890,115.  Specification of Letters Patent.  Patented June 9, 1908.

Application filed March 13, 1906. Serial No. 305,860.

*To all whom it may concern:*

Be it known that I, ALBERT E. WYATT, a citizen of the United States, resident of Hoboken, county of Hudson, State of New Jersey, have invented certain new and useful Improvements in Vending-Machines, of which the following is a specification.

My invention relates to machines for vending various articles of merchandise and has for its object to provide a machine of this kind which is simple in construction, and which will deliver the merchandise only on the insertion of the proper coin.

My invention will be fully described hereinafter and the features of novelty will be pointed out in the appended claims.

Reference is to be had to the accompanying drawings in which

Figure 1 is a sectional view of a machine illustrating a specific embodiment of my invention taken on line 1—1 of Fig. 2; Fig. 2 is a horizontal section thereof on line 2—2 of Fig. 1, and Fig. 3 is a sectional view on the line 3—3 of Fig. 2.

The mechanism comprises a support A which may be of any suitable construction, to which is secured the casing B with which communicates the customary reservoir tube or chute C. A rotatable carrier D is mounted on a shaft E which is suitably supported in the interior casing F. This carrier D is located immediately beneath the open end of the chute C, and receives the merchandise to be vended from said chute in the prescribed quantities in the usual manner. As shown in the present instance the carrier D comprises four shelves D' each of which is successively brought beneath the delivery end of the chute C and receives one of the packages G which are to be sold. Each of these shelves $D^1$ is provided with a flange $D^2$ which prevents the package from being removed from the corresponding shelf in any but the proper direction. The one end of the shaft E projects through the side wall of the interior casing F, and carries a disk H provided on its face with studs or pins $H^1$, the purpose of which will be more fully described hereinafter. A coin chute I is located in a convenient position and is provided at its upper end with an opening $I^1$ in registry with a slot $B^1$ in the casing through which the coin is adapted to be inserted.

J is a slide properly guided in standards $J^1$ secured to the support A and provided with a plunger $J^2$ which extends through the front wall of the casing B and carries a push button $J^3$. A spring $J^4$ serves to maintain the slide J in its forward or normal position as clearly shown in Fig. 1, and a slot $J^5$ in connection with the pin $J^6$ limits the movement of said slide. This slide J is located beneath the open end of the coin chute I and is further provided with an open coin receiving chamber K. A lever L pivoted at $L^1$ to the interior casing F has a curved nose $L^2$ which extends into the coin receiving chamber K, and said lever is further provided with a projection $L^3$, the object of which will be more definitely pointed out hereinafter. The upper end of the lever L is pivotally connected at $L^4$ with a swinging arm M having a notch $M^1$ into which normally projects one of the studs or pins $H^1$ of the disk H. The said arm M is further provided with an extension $M^2$ which projects beneath a second pin or stud $H^1$, said arm being maintained in the position illustrated in Fig. 1 by means of a spring N. A spring O maintains the lever L in its normal position and further acts as a counterbalancing device when the slide J is pushed inwardly.

If a coin of the proper denomination is inserted through the slot $B^1$ and the opening $I^1$ it will travel down the coin chute I and drop into the chamber K in which it is held by means of the nose $L^2$ of the lever L. If pressure is now exerted on the push button $J^3$ the slide J will be pushed inwardly and the coin will abut against the lever L and swing it on its pivot $L^1$. After said lever L has been swung a certain distance the nose $L^2$ will cease to act as a support for the coin which will drop through the chamber K into the coin receptacle, through a suitable opening in the support A, the projection $L^3$ serving as a coin ejector in this instance. During this rearward movement of the slide and the swinging of the lever L the arm M will be carried forward and the notched end will abut against one of the studs $H^1$ and thus rotate the carrier D on its axis E and discharge one of the packages G into the delivery chute P from which said package may be removed by the purchaser. As the carrier D is rotated by the means just described, the pin $H^1$ which follows the one engaged by the recessed end of the arm M will abut against the upper edge of said arm and act as a stop to prevent the carrier from being rotated too far and delivering more than one package at a time. The packages are successively guided into the delivery chute by means of the member Q which is pivoted at $Q^1$ to a suitable support $Q^2$ secured to the casing F, which member Q is maintained in working position by means of a spring $Q^3$.

It will be readily seen by referring to Figs. 2 and 3 of the drawings that as soon as a package leaves one of the shelves $D^1$ of the carrier D it engages the member Q which is swung on its pivot against the tension of the spring $Q^3$ and thus guides the package into the delivery chute P. After the package has passed into said chute the spring $Q^3$ returns the member Q to its normal position. The slide J is provided with a shelf $J^7$ which serves as a closure for the delivery end of the coin chute I when said slide is pushed inward. If a coin is thus inserted into the coin chute while the slide J is in its inner position the said coin will not be lost to the purchaser but will rest on said shelf $J^7$ until the slide is returned to its normal position by means of the spring $J^4$, whereupon the coin will drop into the chamber K and upon the depression of the plunger $J^2$ and push button $J^3$ the mechanism will be operated as before described and a package delivered. This arrangement also prevents the clogging of the coin chute if more than one coin is introduced into the coin chute at the same time. In this case only one coin at a time would be permitted to drop into the receiving chamber K, the succeeding coin being meanwhile held in the coin chute through the medium of the shelf $J^7$.

In order to prevent light weight coins from operating the delivering mechanism a lever R is pivoted at $R^1$ to the side of the coin chute so that it projects into the coin chute in the path of descending coins. At the end opposite to that which extends into the coin chute the said lever is provided with a weight $R^2$ which is not heavy enough to prevent a coin of the required denomination and proper weight from tilting and passing said lever and entering the receiving chamber K. If however a light coin is introduced into the machine, such iron will be unable to swing the lever R aside and the spurious coin will roll from said lever through a transverse slot or opening 18 in the rear wall of the coin chute and will drop through into the coin receptacle without operating the delivering mechanism. A magnet S is suitably secured on a support T adjacent to the coin chute (which, as before stated, is provided in its rear wall with a transverse opening) for the purpose of attracting washers or other iron or steel disks which might otherwise serve as a medium for operating the machine. The metal disk is attracted by the magnet as said disk descends and is drawn through the transverse opening 18 in the coin chute and thereafter drops through into the coin receptacle in the same manner as just described with regard to light weight coins. It is thus impossible to operate the delivering mechanism with anything but a genuine coin of the required denomination.

Various modifications may be made without departing from the nature of my invention as defined in the claims.

I claim and desire to secure by Letters-Patent:

1. In a vending machine, a slide having a coin-receiving chamber, and adapted to move inwardly, means for introducing a coin into said chamber, a pivoted lever arranged to be brought into operative relation with the slide through the medium of the coin, an arm pivoted to said lever and a rotatable carrier for receiving articles of merchandise, provided with a plurality of pins or projections adapted to be engaged by said arm, to bring about a partial rotation of the carrier when said slide is moved inward after the lever and slide have been brought into operative relation through the medium of the coin, the end of said lever being so constructed as to prevent the rise of the coin upon the operation of the slide.

2. In a vending machine, a slide adapted to be moved inwardly and provided with a coin receiving chamber, means for introducing a coin into said chamber, a pivoted lever one end of which extends into said coin receiving chamber, an arm pivoted to the other end of said lever, a rotatable carrier for receiving articles of merchandise, provided with a plurality of pins or projections adapted for engagement with said arm to bring about a partial rotation of the carrier, when said slide is pushed inward after a coin has been introduced into the coin receiving chamber and a projection on said lever adapted to eject the coin from the coin receiving chamber after the slide has been operated.

3. In a vending machine, a rotatable carrier adapted to receive articles of merchandise and provided with a plurality of pins or projections, a pivoted lever, an arm pivoted to said lever and having a projection adapted to engage one of the pins of the carrier and being further provided with an extension adapted to engage another pin of the carrier at the same time that the projection is in engagement with the first named pin, and means for causing said lever and arm to partially rotate said carrier through the medium of a coin.

In testimony whereof I have signed this specification in the presence of two subscribing witnesses.

ALBERT E. WYATT.

Witnesses:
 JOHN LOTKA,
 JOHN A. KEHLENBECK.